United States Patent [19]
Schlaffer et al.

[11] 3,759,233
[45] Sept. 18, 1973

[54] ENGINE COOLING SYSTEM

[75] Inventors: Edward J. Schlaffer, East Peoria;
Stevens E. Wilder, Peoria, both of Ill.

[73] Assignee: Caterpillar Tractor Co., Peoria, Ill.

[22] Filed: May 23, 1969

[21] Appl. No.: 827,304

[52] U.S. Cl............ 123/41.1, 123/41.09, 123/41.08, 123/41.51
[51] Int. Cl............................................... F01p 7/16
[58] Field of Search................... 123/41.1, 41.08, 123/41.09; 236/34.5

[56] References Cited
UNITED STATES PATENTS

| 3,255,740 | 6/1966 | Walsh | 123/41.09 |
|---|---|---|---|
| 2,841,127 | 7/1958 | Baster | 123/41.1 |
| 2,988,068 | 6/1961 | Waydak | 123/41.1 |
| 3,014,467 | 12/1961 | Middendorf | 123/41.1 |
| 3,326,192 | 6/1967 | Gerli | 123/41.09 |

Primary Examiner—Laurence M. Goodridge
Assistant Examiner—Cort Flint
Attorney—Fryer, Tjensvold, Feix, Phillips & Lempio

[57] ABSTRACT

A thermostat assembly having a hot coolant chamber, cold coolant chamber, and a mixing chamber. Heated coolant from the engine enters the hot coolant chamber, causing the thermostatic sensing unit to move a portion of the thermostat assembly so as to allow cold coolant to enter the cold coolant chamber. The heated coolant and the cold coolant both enter the mixing chamber and then pass to an expansion tank, through which they pass to the coolant pump in mixed form.

2 Claims, 4 Drawing Figures

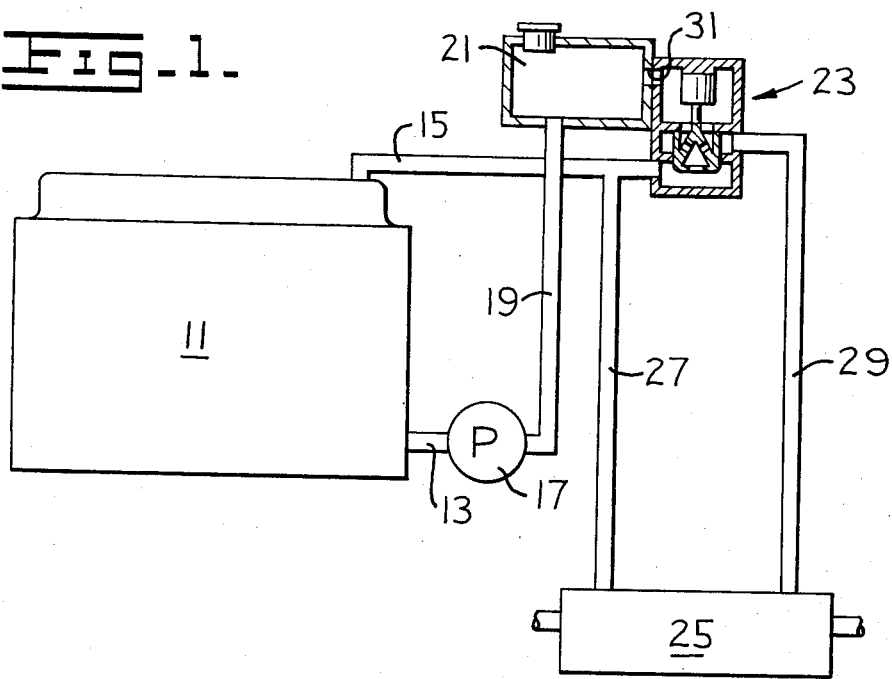
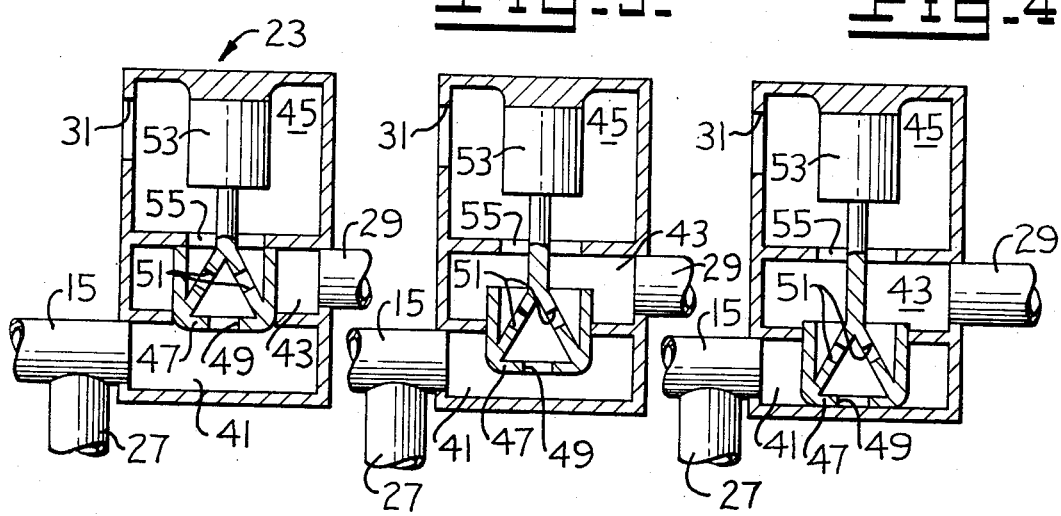

ENGINE COOLING SYSTEM

BACKGROUND AND SUMMARY OF THE INVENTION

This invention relates to a system producing low restriction, improved mixing of hot and cold coolants, and improved aeration while requiring less stringent parameters for heat exchanger conduits.

The cooling systems found on early internal combustion engines were quite simple and usually comprised a mere connection of a radiator to the engine, through which the coolant was circulated by convection.

As engine horsepower requirements increased, engines became more complex. It finally became necessary to add pumps to increase the coolant flow and thermostats to control the coolant temperature within a range best suited for optimum operating conditions.

In many such systems, coolant flowed from the pump, through an engine coolant manifold, and then through a bypass line back to the pump. When a predetermined temperature was reached, a thermostat at the junction at the engine coolant manifold and the bypass line opened, permitting coolant to flow through a heat exchanger and then back to the pump. In utilizing such systems in marine applications, the raw water cooling heat exchanger produces a pressurized drop before the coolant reaches the pump, causing the pump to cavitate at normal operating temperatures.

In follow-on systems, an expansion tank was placed in the system between the heat exchanger and the pump so that, when the thermostat opened, the coolant passing through the thermostat from the engine coolant manifold then passed through the heat exchanger and the expansion tank for delivery to the pump. This stopped the pump from cavitating at normal operating temperatures, but resulted in an influx of cold coolant to the engine when the thermostat opened. Cold coolant, striking the hot surfaces of an engine, can cause high stresses and, upon reaching the thermostat, can cause it to close, permitting warm coolant to circulate through the engine again until the thermostat temperature is reached again. When this occurs, cold coolant is again introduced. The cycling condition created by the introduction of hot and then cold coolant in the engine can lead to the ultimate failure of components.

Further refinement of coolant systems has resulted in a placement of the thermostat in front of the pump on the coolant inlet side of the engine manifold. In these systems, coolant leaving the engine passes through the heat exchanger, the expansion tank, the thermostat, and then the pump. Until the thermostat opens, hot coolant passes through the thermostat to the pump. As the thermostat opens, hot and cold coolant are mixed prior to reaching the engine so little or no cycling occurs.

When it was found that the positioning of the thermostat on the suction side of the pump creates a restriction between the pump and the expansion tank, thus reviving the cavitation problem, a shunt line was added to the system between the expansion tank and the pump so as to maintain a positive pressure on the pump. The shunt line still has the disadvantages of requiring additional piping, critical location of the expansion tank, and difficulty in controlling the plumbing when the engine is installed in environments not controlled by the manufacturer. As a further disadvantage, engines utilizing this system are manufactured such that the thermostat is located on the low side of the engine, necessitating a complete draining of the cooling system when servicing is required.

It is therefore an object of this invention to provide an engine cooling system which obviates all of the above cited disadvantages.

It is also an object of this invention to provide an engine cooling system wherein hot and cold coolant are pre-mixed, eliminating the hot and cold cycling on internal engine components.

It is also an object of this invention to provide a cooling system wherein pre-mixing is accomplished without creating a restriction in front of the coolant pump, thereby eliminating the requirement for additional shunt lines to prevent cavitation of the pump.

It is a further object of this invention to provide an engine cooling system wherein the main coolant flow lines between the engine, pump, expansion tank, and thermostat housing are installed at the factory, thereby providing closer control of their combined functions.

It is a further object of this invention to provide such a cooling system which may be serviced without requiring draining of the engine.

Other objects and advantages of the present invention will become apparent from the following description and claims as illustrated in the accompanying drawing which, by way of illustration, shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWING

FIG. 1 is a schematic illustration of the engine cooling system of the present invention; and FIGS. 2–4 are cross-sectional, schematic illustrations of the thermostat of the present invention, shown in three separate positions.

DETAILED DESCRIPTION

Referring now to FIG. 1 in greater detail, an engine 11 has coolant input 13 and a coolant exhaust 15. A pump 17, supplying coolant to the input 13, draws fluid through a conduit 19 from an expansion tank 21.

Coolant exhaust line 15 directs the heated coolant to a thermostat assembly, generally illustrated at 23, and to a heat exchanger 25, the flow to the heat exchanger passing through a line 27. When, under the conditions described below, the coolant passes through heat exchanger 25, it returns to the thermostat assembly 23 via a line 29.

Thermostat assembly 23 is secured to the expansion tank 21 which is positioned on a level slightly higher than the uppermost coolant level in the engine. A passage 31 interconnects the thermostat assembly to the expansion tank.

Referring now to FIGS. 2–4, the thermostat assembly is shown in greater detail as comprising a hot coolant chamber 41, a cold coolant chamber 43, and a mixing chamber 45. As coolant enters the assembly via the coolant exhaust passage 15, it enters hot coolant chamber 41 and passes through a cup-shaped member 47, via apertures 49 and 51 therein. The fluid then passes through the mixing chamber 45, past the thermostatic element 53, and then to the expansion tank 21 via the passage 31.

As the quantity of heat in the coolant entering the assembly 23 through the exhaust passage 15 increases, thermostat element 53 expands, driving the cup-shaped member 47 downward so as to cause communication of the cold coolant chamber 43 and the mixing chamber 45 via an aperture 55 in the wall separating them. When this occurs, fluid passes through the heat exchanger 25 and line 29 and mixes with the hot coolant, passing through member 47, in the mixing chamber 45. This action causes the conduction of a less heated, but not cold, coolant to the pump 17 from the expansion tank 21 and effectively eliminates the possibility of coolant cycling between hot and cold temperatures.

If the coolant rises to a greater temperature, the sensing unit 53 will force the cup-shaped member 47 still further into the hot coolant chamber 41 until the aperture 49 in the member 47 is sealed against the bottom of chamber 41 to shut off communication of the coolant in exhaust passage 15 with the mixing chamber (FIG. 4). This causes the full flow of coolant to pass through the heat exchanger 25, thereby producing a greater reduction in the heat of the coolant entering expansion tank 21.

Thus, the thermostat is positioned so as to be in the direct flow of coolant from the engine at all times and its sensing unit may be set to commence opening at a predetermined temperature. At or slightly above that temperature, the sensing unit will extend the cup-shaped member a small amount, allowing a relatively small quantity of cold coolant to mix with the hot coolant in the mixing chamber. The two coolants are mixed and discharged into the expansion tank which communicates with the suction side of the coolant pump. As the temperature increases, the cup-shaped member extends further, forcing more hot coolant to the heat exchanger through line 27 for more cooling, before again being mixed with coolant passing through the chamber 41. In this manner, the mixing of the coolant and the discharging of it into the expansion tank prior to its passage into the engine avoids the possibility of an influx of completely cold coolant to the engine, except when the engine itself is cold, as at starting. Further, the direction of all of the coolant to the expansion tank, regardless of the position of the thermostat, greatly de-aerates the coolant, thereby still further reducing the possibility of pump cavitation.

Many modifications and alterations of this invention, which will be obvious to those skilled in the art, may be made in accordance with the present teachings without exceeding the purview of the following claims.

We claim

1. An engine coolant system comprising a thermostat assembly actuatable when the coolant reaches a predetermined temperature, first means transmitting coolant from the engine to the thermostat assembly, second means transmitting at least a portion of the coolant from the engine through a heat exchanger and then to the thermostat assembly when the assembly is actuated at the predetermined temperature, and third means in the thermostat assembly causing all of the coolant from the engine to pass through the heat exchanger prior to reaching the thermostat assembly when the assembly is actuated by the coolant temperature reaching a second predetermined temperature, said thermostat assembly having a hot coolant chamber for receiving coolant from the engine, a cold coolant chamber for receiving coolant from the heater exchanger, a mixing chamber for mixing the hot and cold coolant entering the assembly when the assembly is actuated by a coolant temperature between the first and second predetermined temperatures, and wherein said third means includes a movable member having at least one aperture therein allowing passage of coolant from said first means internally of said thermostat assembly to expansion tank means receiving the coolant passing through the thermostat assembly, said expansion tank means delivering the coolant to the intake side of an engine coolant pump, said thermostat assembly being directly mounted on the expansion tank, said expansion tank being situated, relative to the engine on a level at least as high as the upper-most coolant level in the engine, said thermostat assembly including a thermostatic element located in said mixing chamber, said thermostatic element being connected to said movable member for movement thereof, and wherein said movable member is cup-shaped so as to define a generally cylindrical body having an open end and a closed end, said at least one aperture being in said closed end, said movable member being positioned so as to bring said closed end into sealing contact with a wall of the hot coolant chamber upon actuation by said thermostatic element and thereby close off said aperture in said closed end.

2. The thermostat assembly of claim 1 wherein said movable member has an additional plurality of apertures located within said member for passage of coolant therethrough.

* * * * *